United States Patent [19]

Logsdon

[11] 4,280,305

[45] Jul. 28, 1981

[54] ROOF FLASHINGS FOR USE WITH SOLAR COLLECTOR

[75] Inventor: Duane D. Logsdon, Fullerton, Calif.

[73] Assignee: The Logsdon Foundation, Stanton, Calif.

[21] Appl. No.: 89,614

[22] Filed: Oct. 29, 1979

Related U.S. Application Data

[63] Continuation-in-part of Ser. No. 42,216, May 24, 1979, which is a continuation-in-part of Ser. No. 883,420, Mar. 6, 1978, Pat. No. 4,160,347.

[51] Int. Cl.³ .............................................. E04D 1/36
[52] U.S. Cl. .......................................... 52/58; 52/199; 285/43
[58] Field of Search ................... 52/199, 58, 218, 219; 285/42, 43, 44; 277/183, 184, 185, 186

[56] References Cited

U.S. PATENT DOCUMENTS

| 3,313,559 | 4/1967 | Kifer ...................................... 285/43 |
| 3,807,110 | 4/1974 | Kaminski ............................ 285/44 X |
| 3,945,163 | 3/1976 | Nagler et al. ....................... 285/44 X |
| 4,130,286 | 12/1978 | Ernst et al. ....................... 277/183 X |

*Primary Examiner*—Carl D. Friedman

*Attorney, Agent, or Firm*—K. H. Boswell; Edward D. O'Brian

[57] ABSTRACT

A roof flashing structure for use in sealing the tubes and wires leading to and from a solar collector where said tubes and wires pass through the roof has a generally flat plate with an upstanding housing integrally formed with the plate, both of a rigid material. The flat plate has an opening in it where the housing meets with the plate and the upper end of the housing has an opening wherein a resilient elastomeric sealing member is located. The elastomeric sealing member has an upper surface and a lower surface and includes a plurality of generally circular apertures extending upwardly from the lower surface. Formed with the upper surface over the top of each of the apertures is an upstanding boss which seals the apertures. Within the interior of each of the apertures are a plurality of sealing flanges located one above the other along the length of the aperture between the lower surface and the sealed end. Each of the sealing flanges extends circularly around the aperture and projects radially toward the center of the aperture. The top portion of the bosses are capable of being severed by a sharp instrument unsealing the apertures. Each of the flanges within the apertures are capable of forming a seal with a tube or a wire passed through the unsealed aperture.

10 Claims, 3 Drawing Figures

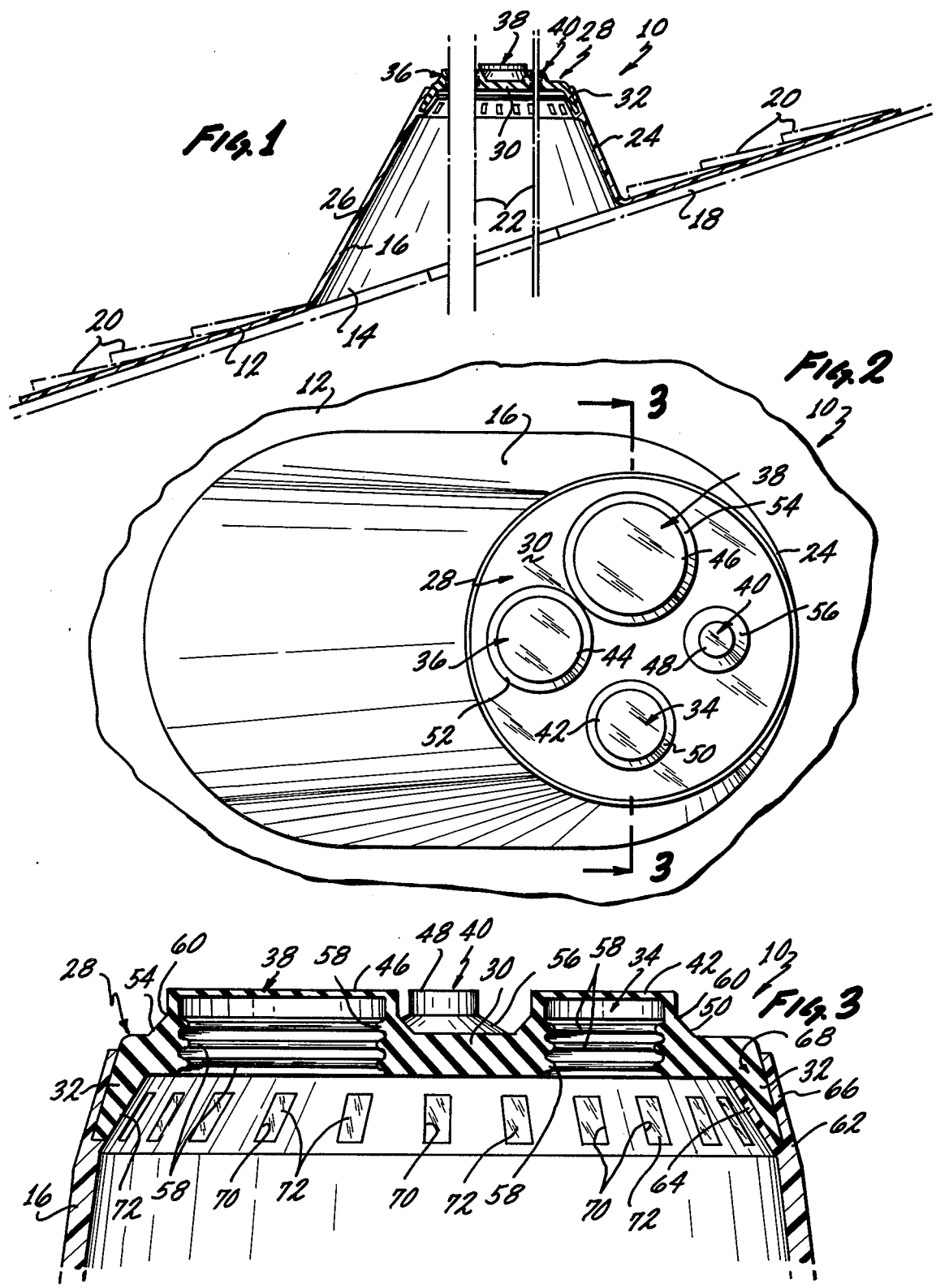

ROOF FLASHINGS FOR USE WITH SOLAR COLLECTOR

CROSS REFERENCE TO RELATED APPLICATIONS

This application is a continuation in part of my application Ser. No. 042,216, filed May 24, 1979 which in turn is a continuation in part of my application Ser. No. 883,420, filed March 6, 1978, now U.S. Pat. No. 4,160,347 the entire disclosures of both of these applications are herein incorporated by reference. Further, this application is related to my U.S. Pat. No. 4,010,578, the disclosure of which is also incorporated by reference.

BACKGROUND OF THE INVENTION

A roof flashing structure is disclosed which is used to seal around tubing and wires passing through a roof which primarily is used for solar collectors. This roof flashing structure includes an elastomeric sealing member which is molded into a permanent bond with the housing of the flashing and is capable of forming a tight seal with a length of tubing or wire.

Because of the recent awareness of the earth's limited potential for supplying man with energy the development of devices which can directly harness the sun's energy has increased. Presently the field of solar energy is being expanded to include devices for heating swimming pools, hot water for homes and devices for supplying heat to heat reservoirs which are utilized for heating the buildings. Associated with these solar devices and in fact one of the primary components is the solar collector.

Sunlight only contains a particular radiant flux. There are losses converting this radiant flux into heat energy or some other energy form. Presently this necessitates the use of solar collectors having a large surface area in order to adequately harvest as much of the sun's energy as as possible. A solar collector harvests the sun's energy by utilizing this energy to heat a liquid or gas. For home use, generally a liquid is heated. This requires passing a volume of liquid through the collector and then passing the heated liquid to the appliance which will utilize the heated liquid. Because of the space taken up by solar collectors the most useful location for them is on the roof of the building wherein the appliance is located. At the minimum, an inlet and an outlet pipe must be passed through the roof to the collector. Additionally, if a pump or switch is located in conjunction with the collector an electrical wire must also be passed through the roof.

In my prior U.S. Pat. No. 4,010,578 and my Patent application Ser. Nos. 883,420 and 042,216 I described certain roof flashing structures each having unique and novel properties which are useful to seal the openings wherein a pipe used as a sewer vent or the like is passed through the roof. Generally such pipes have diameters at least as large as one and a half inches. My prior roof flashing structure and other prior roof flashing structures are adapted to accept one size of pipe having a set outside diameter.

The presently known roof flashing structures, since they are designed only for plumbing vent pipes and the like, simply do not lend themselves to applications involving the small diameter tubing and/or wires which must pass through a roof before being connected to the collector. As such the present solar installations are left with the antiquated methods previously used to seal pipes such as caulking or other mastic type materials and sheet metal flashings. From the above it is evident that there exists a need for a roof flashing structure which can accept and seal the small diameter tubes and wires used in conjunction with solar collectors.

BRIEF SUMMARY OF THE INVENTION

It is an object of this invention to fulfill the above noted need and supply a roof flashing structure useful with small diameter tubing and wires. It is a further object to provide a flashing which, because it is economical to manufacture is economical to the consumer. Additionally, it is an object to provide a flashing which can be utilized with a variety of different sized tubings and/or wires.

These and other objects as will become evident from the remainder of this specification are achieved by providing a roof flashing structure used to form a seal between a roof and at least one tube or wire extending through the roof, the flashing structure of the type including a generally flat plate formed of a rigid material and having a centralized opening and an upstanding tapered housing integrally formed with the flat plate from the same rigid material and extending upwardly from the flat plate about the centralized opening such that the centralized opening in the flat plate forms the lowermost opening in the housing which comprises: a resilient elastomeric sealing means having a generally flat circular top member, said flat circular member having an upper surface and a lower surface, a first interlocking means located on and projecting from the periphery of the top member; said top member including a plurality of generally circular aperture means extending upwardly from the lower surface of the top member and culminating in an upstanding boss integrally formed with and extending upwardly from the upper surface of said top member, said upstanding boss sealing the upper ends of said aperture means, each of said aperture means including a plurality of sealing flanges located one above the other along the length of said aperture means between said lower surface and the sealed end of said aperture means and extending circularly around said aperture means and projecting radially toward the center of said aperture means, at least the upper portion of each of said bosses capable of being severed from said top member unsealing said aperture means, said flanges each being independently capable of engaging with and forming a seal with one of said tubes or said wire passing through said unsealed aperture means; the uppermost periphery of said housing including a second interlocking means, said first interlocking means capable of locking with said second interlocking means locking and maintaining said elastomeric sealing member in the uppermost periphery of said housing.

Said elastomeric sealing means preferably attaching to said housing in the manner described in my application Ser. No. 042,216.

BRIEF DESCRIPTION OF THE DRAWINGS

This invention will be better understood when taken in conjunction with the drawings wherein:

FIG. 1 is a side elevational view of the preferred embodiment of the invention showing the invention attached to a roof and including pieces of tubing shown in phantom;

FIG. 2 is a top plan view of that portion of the invention shown in the center of FIG. 1; and FIG. 3 is a side elevational view in section about the line 3—3 of FIG. 2 of the top portion of the invention shown in FIG. 1.

This invention utilizes certain operative principles and/or concepts as set forth and defined in the claims appended to this specification. Those skilled in the art to which this invention pertains will realize that these principles or concepts could be applied to a number of differently appearing embodiments. For this reason this invention is to be construed in light of the claims appended hereto and is not to be construed as being limited to the exact embodiment described in the specification and illustrated in the drawing.

DETAILED DESCRIPTION

The roof flashing structure 10 of the invention has a flat plate 12 having a central hole or opening 14 around which an upstanding housing member 16 is located. The housing member 16 is integrally formed with the flat plate using standard molding techniques. The flat plate 12 fits flush against a subroofing 18 and shingles or other roofing material 20 are apropriately located over the flat plate 12. The solar collector (not shown or numbered) used in conjunction with this invention is also located on the roof 20.

Normally the flashing structure 10 would be located proximal to the solar collector. The tubing generally identified by the numeral 22, no matter what its size or materials, would extend from the collector through the structure 10 to the interior of the building on which the collector is located. In order to insure the best flow characteristics of the liquid flowing through the collector tubing 22, the tubing 22 should be laid out and passed through the structure 10 having a minimum number of bends.

Since most roofs have somewhat of a pitch to them, the housing 14 is preferably shaped as the frustrum of a cone. The planes cutting the cone to generate this shape are not coplaner resulting in the frustrum being located in respect to the plane of the flat plate 12 in a manner such that as viewed in FIG. 1. One cut edge 24, shown in cross section, of the frustrum is essentially perpendicular to the flat plate 12 while the other cut edge 26 intersects the flat plate 12 at an oblique angle. This allows the tubing 22 to be passed through the structure 10 as a straight segment regardless of the pitch of the roof from flat to a very steep angle.

While the shape described in the above paragraph is the preferred shape other shapes for the flat plate 12 and housing 16 could be used depending upon installation requirements. As for example, for an embodiment designed specifically for flat roofs the housing 16 would not have to be inclined from the flat plate and its height could be modified since the tubing 22 would be passing almost perpendicular to the roof. The sealing member 28 includes a generally flat disk 30 formed of an elastomeric compound as hereinafter described and having an annular skirt 32 integrally formed around its perimeter. The skirt 32 extends downward and obliquely outward such that the lowermost periphery of this skirt forms a larger circle than the upper portion of this skirt. Located in the disk 30 are four passageways 34, 36, 38 and 40. In the embodiment shown in the figures, these passageways each are of a different diameter.

The tubing used in connection with collectors would generally be copper tubing of ¾, ½, ⅜ or ¼ inch size. In addition it is sometimes necessary to equip the collector with an electrical wire. Most often the inlet tube to the collector will be of a smaller diameter than the outlet tube of the collector. This is to accommodate the expansion of the liquid when it passes from the collector in a heated state through the outlet tube. In the embodiment illustrated, the passageways 34, 36, 38 and 40 are shown to be of different diameters which would accomodate different diameter tubing, however, they could be all of the same diameter or one or more could be of the same diameter with the remainder of different diameters.

Integrally formed with the disk 30 over each of the passageways 34 through 40 are upstanding bosses, 42, 44, 46 and 48 respectively. The bosses seal the ends of the passageway which are directed upwardly. As shown in the embodiment depicted in the figures, preferably the base of each of the bosses 42 through 48 is slanted outwardly to form a small cone identified by the numerals 50, 52, 54 and 56 respectively at the base of each boss where it intersects the disk 30.

Located within the interior of each of the passageways 34 are a plurality of circular extending flanges all collectively identified by the numeral 58. The flanges 58 are spaced one from the other along the length of the passageways 34 through 40. When a particular passageway, as hereinafter explained, is used to seal a piece of tubing the flanges 58 abut against the sides of the tubing and form a plurality of seals along the length of the tubing where the tubing passes through the sealing member 28.

Normally one passageway will be used for an inlet tube and a second for an outlet tube. The particular passageway chosen is unsealed by severing the top of the boss located over the particular passageway with a sharp instrument such as a razor blade or the like. The point 60 where the cones 50 through 56 intersect the vertical edge of the bosses 42 through 48 forms a convenient severing place. When severed the severing instrument rides along the top of the cones 50 through 56 at this point 60 conveniently and neatly opening up the passageways 34 through 40. After the passageways are opened the tubing 22 is simply inserted into the passageways and instantly sealed by the interaction of the tubing with the flanges.

In the embodiment illustrated the smallest passageway 40 is conveniently used for passage of an electrical wire through the structure 10 and consequently through the roof. Normally the interior dimension of the passageway 40 would be 1/16 of an inch. Since the sealing member 28 is made of an elastomeric material as hereinafter described, the passageway 40 conveniently stretches to accommodate at least a 3/16 inch wire and also will stretch to fit, but will still tightly seal against an eliptical or oblong shaped wire.

The uppermost periphery 62 of the housing 16 is, as best seen in FIG. 3, divided into two walls, an inner wall 64 and an outer wall 66. The walls 64 and 66 are divided by a channel 68. The shape of the skirt 32 of the sealing member 28 exactly mimics the shape of the channel 68 because of the process used to form sealing member 28, as hereinafter described. Extending around the inner wall 64 are a plurality of passageways, collectively identified by the numeral 70. These passageways 70 extend through the inner wall 64 and form passageways between the channel 68 and the interior of the housing 16.

In constructing the structure 10 as noted above the flat plate 12 and the housing 14 including the inner wall 64 and the outer wall 66 are molded as a one piece integral unit. This unit is then extracted from the die in which it was formed and positioned in association with a second die. The sealing member 28 is then molded in the second die in part and in part in the housing inner and outer walls 64 and 66. The shape of the skirt 32 is thus dependent upon the shape of the channel 68 and thus completely mimics this shape during the molding process. Further, the mold used in this step allows excess elastomeric material to flow into the passageways 70 forming a plurality of tabs and projections 72 which are locked in the passageways 70. This molding technique results in a strong mechanical bond between the sealing member 28 and the housing 16 as well as a thermal bond between the materials of the sealing member 28 and housing 16 because of the thermal compatibility of these materials.

Preferably the housing 16 is molded of a thermal plastic such as a polyethylene base TPR thermal plastic. The sealing member 28 is preferably molded of a polyethylene elastmeric material. Since both of these materials have a polyethylene base they are compatible with each other and when subjected to heat during the molding of sealing member 28 the two members become bonded to each other in what could loosely be characterized as a "vulcanization" like process. Not only is the sealing member 28 attached to the housing 16 via the interlcoking of the tabs 72 with passageway 70, but additionally a thermally formed seal is achieved between the skirt 32 and the outer wall 66 and inner wall 64 including the passageway 70.

I claim:

1. A roof flashing structure used to form a seal between a roof and at least one tube or wire extending through the roof, the flashing structure of the type including a generally flat plate formed of a rigid material and having a centralized opening and an upstanding tapered housing integrally formed with said flat plate from said rigid material and extending upwardly from said flat plate about said centralized opening such that the centralized opening in the plate forms the lowermost opening in the housing which comprises:

a resilient elastomeric sealing means having a generally flat circular top member, said flat circular top member including an upper surface and a lower surface, a first interlocking means located on and projecting from the periphery of said top member;

said top member including a plurality of generally circular aperture means extending upwardly from the lower surface of said top member and culminating in an upstanding boss integrally formed with and extending upwardly from the upper surface of said top member, said upstanding bosses sealing the upper ends of said aperture means, each of said aperture means including a plurality of sealing flanges located one above the other along the length of said aperture means between said lower surface and said sealed end of said aperture means and extending circularly around said aperture means and projecting radially toward the center of said aperture means, at least the upper portion of each of said bosses capable of being severed from said top member unsealing said aperture means, said flanges each being independently capable of engaging with and forming a seal with one of said tube or said wire passed through said unsealed aperture means;

the uppermost periphery of said housing including a second interlocking means, said first interlocking means capable of locking with said second interlocking means locking and maintaining said elastomeric sealing means in the uppermost periphery of said housing.

2. The roof flashing structure of claim 1 wherein:

said resilient elastomeric sealing means comprises a generally flat circular member shaped to fit within the upper periphery of said housing and having an upper surface and a lower surface which are essentially coplaner with each other;

said aperture means each comprise a cylindrical passageway opening through said lower surface and extending upwardly through said upper surface, each of said passageways extending into said boss located over said passageway, said sealing flanges located along the lengths of said passageways, each of said passageways sized to correspond to accept a standard diameter tube or wire.

3. The roof flashing structure of claim 2 wherein:

at least one of said passageways is of a different diameter than any of the other of said passageways.

4. The roof flashing structure of claim 2 wherein:

said first interlocking means comprises an annular skirt means projecting downwardly from the periphery of said generally flat circular member;

said second interlocking means comprises the uppermost periphery of said housing including a generally upwardly opening annular channel means dividing said uppermost periphery into an inner annular support means and an outer annular support means;

said annular skirt means fitting into said annular channel means so as to position said annular skirt means between said inner annular support means and said outer annular support means;

said annular skirt means being capable of being thermally bonded to at least said inner annular support means locking said annular skirt means in said annular channel means and maintaining said flat circular member fixedly held in the uppermost periphery of said housing.

5. The roof flashing structure of claim 4 wherein:

said inner annular support means comprises an inner upstanding wall integrally formed with said housing and said outer annular support means comprises an outer upstanding support wall integrally formed with said housing;

said inner upstanding wall and said outer upstanding wall both being concentric about an axis passing longitudinally through said housing, said inner upstanding wall lying inside of said outer upstanding wall.

6. The roof flashing structure of claim 5 wherein:

said annular channel means comprises a channel between said inner upstanding wall and said outer upstanding wall and said skirt means comprises an annular skirt member dimensioned to fit within said channel and sealing against both of said inner upstanding wall and said outer upstanding wall.

7. The roof flashing structure of claim 6 wherein:

said inner upstanding wall includes a plurality of passageways spaced around said inner upstanding wall, said passageways forming a plurality of openings between said annular channel and the interior of said housing;

said annular skirt including a plurality of projection means equal in number to said passageways and spaced about said annular skirt in an array identical to the spacing of said passgeways, said projection means projecting essentially radially towards the center of said centralized opening, said projection meand fitting into and filling said passageways forming a mechanical bond between said annular skirt and said inner upstanding wall.

8. A roof flashing structure used to form a seal between a roof and at least one tube or wire extending through the roof, the flashing structure of the type including a generally flat plate formed of a rigid material and having a centralized opening and an upstanding tapered housing integrally formed with said flat plate from said rigid material and extending upwardly from said flat plate about said centralized opening such that the centralized opening in the plate forms the lowermost opening in the housing which comprises:

a resilient elastomeric sealing means having a generally flat circular top member, said flat circular top member including an upper surface and a lower surface, a first interlocking means located on and projecting from the periphery of said top member;

said top member including a plurality of generally circular aperture means extending upwardly from the lower surface of said top member and culminating in an upstanding boss integrally formed with and extending upwardly from the upper surface of said top member, said upstanding bosses sealing the upper ends of said aperture means, each of said aperture means including a plurality of sealing flanges located one above the other along the length of said aperture means between said lower surface and said sealed end of said aperture means and extending circularly around said aperture means and projecting radially toward the center of said aperture means, at least the upper portion of each of said bosses capable of being severed from said top member unsealing said aperature means, said flanges each being independently capable of engaging with and forming a seal with one of said tube or said wire passed through said unsealed aperture means;

the uppermost periphery of said housing including a second interlocking means, said first interlocking means capable of locking with said second interlocking means locking and maintaining said elastomeric sealing means in the uppermost periphery of said housing;

and wherein:

said resilient elastomeric sealing means comprises a generally flat circular member shaped to fit within the upper periphery of said housing and having an upper surface and a lower surface which are essentially coplaner with each other;

said aperture means each comprise a cylindrical passageway opening through said lower surface and extending upwardly through said upper surface, each of said passageways extending into said boss located over said passageway, said sealing flanges located along the lengths of said passageways, each of said passageways sized to correspond to accept a standard diameter tube or wire;

at least one of said passageways is of a different diameter than any of the other of said passageways;

said first interlocking means comprises an annular skirt means projecting downwardly from the periphery of said generally flat circular member;

said second interlocking means comprises the uppermost periphery of said housing including a generally upwardly opening annular channel means dividing said uppermost periphery into an inner annular support means and an outer annular support means;

said annular skirt means fitting into said annular channel means so as to position said annular skirt means between said inner annular support means and said outer annular support means;

said annular skirt means being capable of being thermally bonded to at least said inner annular support means locking said annular skirt means in said annular channel means and maintaining said flat circular member fixedly held in the uppermost periphery of said housing;

said inner annular support means comprises an inner upstanding wall integrally formed with said housing and said outer annular support means comprises an outer upstanding support wall integrally formed with said housing;

said inner upstanding wall and said outer upstanding wall both being concentric about an axis passing longitudinally through said housing, said inner upstanding wall lying inside of said outer upstanding wall;

said annular channel means comprises a channel between said inner upstanding wall and said outer upstanding wall and said skirt means comprises an annular skirt member dimensioned to fit within said channel and sealing against both of said inner upstanding wall and said outer upstanding wall;

said inner upstanding wall includes a plurality of passageways spaced around said inner upstanding wall, said passageways forming a plurality of openings between said annular channel and the interior of said housing;

said annular skirt including a plurality of projection means equal in number to said passageways and spaced about said annular skirt in an array identical to the spacing of said passageways, said projection means fitting into and filling said passageways forming a mechanical bond between said annular skirt and said inner upstanding wall;

said housing including said inner and said outer support walls is formed of a polyethylene base thermal plastic and said flat circular member is formed of a polyethylene base rubber such that when said polyethylene based rubber in a heated state contacts said polyethylene based plastic, upon cooling a bond is formed between said rubber and said plastic.

9. The roof flashing structure of claim 8 wherein:

said channel is V-shaped in cross-section and said inner upstanding wall and said outer upstanding wall both are upstanding essentially straight walls forming the sides of said V-shaped channel;

said annular skirt is V-shaped in cross-section having a shape exactly corresponding to the shape of said channel and fitting within said channel such that there is no void spaces between said skirt and said inner upstanding wall and said outer upstanding wall.

10. The roof flashing structure of claim 9 wherein:

each of said passageways is of a different diameter than any of the other of said passageways, one of said passageways sized to accept and seal against a wire extending through said passageway, the other of said passageways sized to accept and seal against standard sized copper tubing.

* * * * *